United States Patent [15] 3,649,197
Yang et al. [45] Mar. 14, 1972

[54] PREPARATION OF ALKYL HALIDES AND SULFUR FROM HYDROGEN SULFIDE, ALCOHOLS AND HALIDES

[72] Inventors: Kang Yang; James D. Reedy, both of Ponca City; Jimmy H. Stanton, Lawton, all of Okla.

[73] Assignee: Continental Oil Company, Ponca City, Okla.

[22] Filed: Sept. 19, 1969

[21] Appl. No.: 859,583

[52] U.S. Cl.................................23/224, 260/657, 260/660
[51] Int. Cl.........................................................C07c 17/16
[58] Field of Search...................23/224, 225, 152, 154, 156; 260/657, 660

[56] References Cited

UNITED STATES PATENTS

| | | | |
|---|---|---|---|
| 1,950,827 | 3/1934 | Teupel | 260/657 |
| 2,028,087 | 1/1936 | Clifford | 23/156 |
| 2,404,800 | 7/1946 | Hirschkind | 23/657 |
| 2,622,107 | 12/1952 | Mattson | 23/657 |

*Primary Examiner*—Oscar R. Vertiz
*Assistant Examiner*—G. O. Peters
*Attorney*—Joseph C. Kotarski, Henry H. Huth, Jerry B. Peterson, Jack N. Shears and Carroll Palmer

[57] ABSTRACT

Alkyl halides and sulfur are formed and recovered by reacting hydrogen sulfide, bromine or iodine and ethyl or methyl alcohol in the presence of an acid and an alkali metal halide.

9 Claims, No Drawings

PREPARATION OF ALKYL HALIDES AND SULFUR FROM HYDROGEN SULFIDE, ALCOHOLS AND HALIDES

BACKGROUND OF INVENTION

1. Field of Invention

This invention relates to the preparation of alkyl halides and sulfur from the reaction of hydrogen sulfide, a halide and an alcohol in the presence of an acid and an alkali metal halide.

2. Description of Prior Art

Alkyl bromides have been prepared by reacting hydrobromic acid and an alcohol in the presence of a dehydrating agent. The hydrobromic acid has been formed in situ by reacting sulfur dioxide and bromine.

Hydrogen sulfide has been reacted with bromine and methyl alcohol to form methyl bromide and sulfuric acid.

The sulfur dioxide process is subject to a practical limitation in requiring the use of sulfur dioxide of a high degree of concentration, which is not readily available at many locations. The hydrogen sulfide process is quite satisfactory; however, it is sometimes desirable to recover sulfur from the reaction instead of sulfuric acid.

SUMMARY OF INVENTION

According to this invention alkyl halides and sulfur are produced and recovered by reacting hydrogen sulfide, bromine or iodine, and ethyl or methyl alcohol, in the presence of an acid and an alkali metal halide.

DETAILED DESCRIPTION

Alkyl halides are extensively employed in various chemical syntheses. Of particular importance in the oil industry is the use of ethyl and methyl halides in the preparation of tetraethyl and tetramethyl lead. Also, the product sulfur is much more valuable than hydrogen sulfide.

In carrying out the process so that alkyl halides and sulfur are formed and recovered, the reaction of hydrogen sulfide, bromine or iodine, and methyl or ethyl alcohol is carried out in the presence of an acid, such as hydrochloric acid, and an alkali metal halide, such as lithium, potassium or sodium chloride, bromide or iodide.

When the reaction is carried out using bromine, the sulfur which is formed is oxidized to sulfuric acid. An acid, such as hydrochloric acid, and an alkali metal halide, such as lithium, potassium or sodium, chloride, bromide, or iodide are added to prevent the oxidation of the sulfur formed and to aid in the separation of the sulfur from the solution in which it is formed. While iodine does not appear to oxidize the sulfur formed, the addition of the acid and alkali metal halide is quite beneficial in the separation of the sulfur from the solution. Water can also be added along with the acid and alkali metal halides to aid in the separation of the sulfur from the solution.

The halides which have been found suitable for this reaction are bromine and iodine and the alcohol can be methyl or ethyl alcohol.

The reaction is typically carried out as a two-step reaction with the first step being the reaction of hydrogen sulfide and bromine or iodine to form a hydrogen halide and sulfur. This reaction can be carried out at room temperature. The second step is the reaction of the hydrogen halide with the alcohol to form the alkyl halide. This reaction is preferably carried out at a temperature in excess of 100° C.

The following example illustrates the process of this invention.

TABLE

| Experiment Number | Reactants | | | | | Reaction cond. | | Products | | Percent yield |
|---|---|---|---|---|---|---|---|---|---|---|
| | ROH (g.) | $I_2$ (g.) | $Br_2$ (g.) | Water (g.) | Others (g.) | T (° C.) | Time (hrs.) | RBr (g.) | RI (g.) | |
| 1 | $C_2H_5OH$ (100) | | 6.7 | 10 | LiBr (10) 12N HCl (10) | 130 | 2 | 6.18 | | 65.0 |
| 2 | $C_2H_5OH$ (100) | 5 | | 0 | NaI (10.01) | 130 | 1 | | 3.53 | 57.5 |
| 3 | $C_2H_5OH$ (100) | 5 | | 10 | NaI (10) 12N HCl (10) | 130 | 2 | | 5.46 | 89.0 |
| 4 | $CH_3OH$ (100) | 5.04 | | 10 | NaCl (10) | 100 | 1 | | 2.40 | 43.0 |

EXAMPLE

The halogen, alcohol mixture with various additives given in the following table was charged with about 15 p.s.i. of hydrogen sulfide. After the halide color disappeared, sulfur formed was filtered off. The remaining solution was charged in a reactor and heated. The resulting products were analyzed chromatographically. The results are summarized in the following table.

Having thus described the invention by providing specific examples thereof, it is to be understood that no undue limitations or restrictions are to be drawn by reason thereof and that many variations and modifications are within the scope of the invention.

What is claimed is:

1. A process for making and recovering an alkyl halide and sulfur which comprises:
   a. reacting hydrogen sulfide, a halogen selected from the group consisting of bromine and iodine, and an alcohol selected from the group consisting of ethyl and methyl alcohol, in the presence of hydrochloric acid and an alkali metal halide;
   b. recovering sulfur formed in step (a);
   c. heating the solution remaining after recovering the sulfur in step (b); and
   d. recovering said alkyl halide.

2. The process of claim 1 wherein said halogen is iodine.

3. The process of claim 1 wherein said halogen is bromine.

4. The process of claim 1 wherein said alcohol is ethyl alcohol.

5. The process of claim 1 wherein said alcohol is methyl alcohol.

6. The process of claim 1 wherein said solution is heated above about 100° C. in step (c).

7. The process of claim 1 wherein water is present in step (a).

8. The process of claim 1 wherein the sulfur is recovered in step (b) by filtration.

9. A process for making and recovering an alkyl iodide and sulfur which comprises:
   a. reacting hydrogen sulfide, iodine, and an alcohol selected from the group consisting of ethyl and methyl alcohol;
   b. recovering sulfur formed in step (a);
   c. heating the solution remaining after recovering the sulfur in step (b); and
   d. recovering said alkyl iodide.

* * * * *